US012117536B2

(12) United States Patent
Chao et al.

(10) Patent No.: US 12,117,536 B2
(45) Date of Patent: Oct. 15, 2024

(54) SYSTEMS AND METHODS FOR TRANSFORMING AUTONOMOUS AERIAL VEHICLE SENSOR DATA BETWEEN PLATFORMS

(71) Applicant: Ford Global Technologies, LLC, Dearborn, MI (US)

(72) Inventors: Steven Chao, San Francisco, CA (US); Ganesh Kumar, Santa Clara, CA (US); Apurbaa Mallik, Santa Clara, CA (US)

(73) Assignee: Ford Global Technologies, LLC, Dearborn, MI (US)

( * ) Notice: Subject to any disclaimer, the term of this patent is extended or adjusted under 35 U.S.C. 154(b) by 284 days.

(21) Appl. No.: 17/819,124

(22) Filed: Aug. 11, 2022

(65) Prior Publication Data

US 2024/0053487 A1    Feb. 15, 2024

(51) Int. Cl.
*G01S 19/23*  (2010.01)
*G01S 19/24*  (2010.01)

(52) U.S. Cl.
CPC ............ *G01S 19/235* (2013.01); *G01S 19/24* (2013.01)

(58) Field of Classification Search
None
See application file for complete search history.

(56) References Cited

U.S. PATENT DOCUMENTS

| 9,409,644 | B2 | 8/2016 | Stanek et al. | |
| 2020/0247431 | A1* | 8/2020 | Ferencz | G01C 21/3658 |
| 2020/0398985 | A1 | 12/2020 | Hsu | |
| 2023/0252903 | A1* | 8/2023 | Xu | B64C 39/024 701/3 |
| 2023/0386175 | A1* | 11/2023 | Prophet | G06V 10/26 |

FOREIGN PATENT DOCUMENTS

| DE | 102011106170 A1 | 2/2012 |
| FR | 2986647 A3 | 8/2013 |

OTHER PUBLICATIONS

Ford, Ford Studies Using Drones to Guide Self-Driving Cars, Dec. 15, 2016, 1-3.

* cited by examiner

*Primary Examiner* — Ladimir Magloire
*Assistant Examiner* — Eric K Hodac
(74) *Attorney, Agent, or Firm* — Emily Drake; Eversheds Sutherland (US) LLP

(57) ABSTRACT

Systems and methods for transforming autonomous aerial vehicle sensor data between platforms are disclosed herein. An example method can include receiving, by an UAV, vehicle radar data and radar calibration data from a vehicle, as well as location information for a location of the vehicle, determining a simulated UAV at the location, establishing an orientation for a simulated radar on a bottom of the simulated UAV, determining a height for the simulated UAV to match a field of view of the simulated radar, performing a geometrical transformation to convert the vehicle radar data set into a UAV perspective, converting the vehicle radar data into a vehicle coordinate frame using the radar calibration using vehicle global positioning system (GPS) coordinates, converting the vehicle coordinate frame from a global frame into a UAV coordinate frame using UAV GPS coordinates, and converting the UAV coordinate frame into simulated radar sensor frame.

20 Claims, 5 Drawing Sheets

SYSTEMS AND METHODS FOR TRANSFORMING AUTONOMOUS AERIAL VEHICLE SENSOR DATA BETWEEN PLATFORMS

BACKGROUND

Current Unmanned Aerial Vehicle (UAV) datasets largely feature camera data, to the exclusion of lidar and radar detections. This lack of data availability is due to the bulk of outfitting the UAV with these sensors. However, without UAV datasets including radar and lidar sensor data, it can be very challenging to develop UAV sensor fusion algorithms.

UAVs may onboard a variety of sensors for detecting objects on the ground below, as well as sensors for detecting other objects in flight. However, the perspective used to obtain these data on the ground is skewed due, in part, to the elevation at which the UAV operates. Vehicles also possess a variety of onboard sensors, including radar and lidar, which can be used to obtain data around their operating environment, such as other vehicles, pedestrians, buildings, and/or other infrastructure. These data are gathered from the perspective of the vehicle, which is lower to the ground.

BRIEF DESCRIPTION OF THE DRAWINGS

A detailed description is set forth regarding the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

Figure 1:
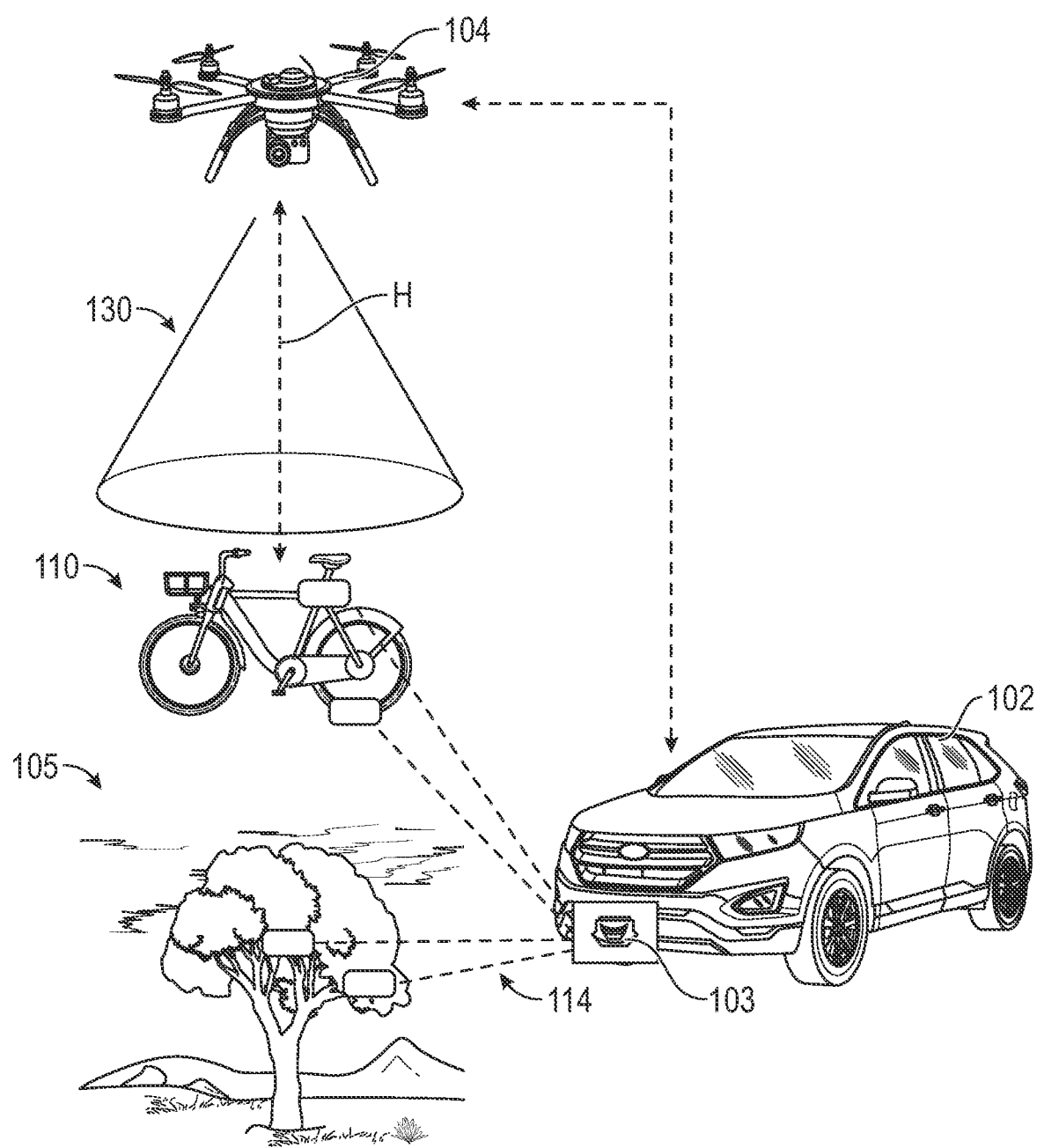
FIG. 1 illustrates an example environment where aspects of the present disclosure may be practiced in accordance with one or more embodiments of the present disclosure.

Disclosed are systems and methods used to transform automotive sensor datasets into UAV simulated datasets. In some instances, this includes the use of radar data, however, other sensor data can be transformed as well. To transform the automotive dataset from the vehicle sensors of an ego vehicle into a UAV perspective, a simulated UAV can be considered at the same cartesian coordinate position as the ego vehicle, flying at a height h above the vehicle. A simulated radar can be mounted on the bottom of the UAV, facing directly down, providing a simulated Birds-Eye View (BEV) of a traffic scene. A height that the UAV is flying can be selected to match the radar's field of view (FOV) as closely as possible to the vehicle's FOV, to utilize an angular resolution of the UAV radar.

Then, for radar detection events in the automotive dataset, a geometric transformation can be used to convert the automotive data set from the vehicle's sensor data into the UAV's perspective. An example method disclosed herein can be used to process frames in a scene, resulting in a simulated dataset of a UAV flying directly above a path of the ego vehicle, with simulated radar detections for a BEV radar.

These systems and methods can be used to increase radar simulation realism, leveraging various sensors in addition to radar in the dataset, if available. For example, if lidar data is available in the automotive dataset, it can be used to resolve the elevation ambiguities in automotive radar. Currently, since only radial velocity is returned from the automotive radar, transforming it into a UAV perspective isn't realistic. However, by combining these data with camera output available in the automotive dataset, an optical flow from cameras can be used to obtain a true three-dimensional velocity of objects, resulting in realistic radial velocity for UAV simulated points.

Stated otherwise, the present disclosure provides for a transformation of existing automotive datasets that include radar data into a simulated perspective of a UAV equipped with radar. This approach is a method to leverage existing automotive datasets that include radar data and ground truth class annotations (a time-consuming process) and repurpose the data to train UAV perception algorithms, resulting in a bird's-eye view of a scene in real-time that may be used to develop challenging advanced driver assistance systems (ADAS) systems without sensors.

Various non-limiting advantages can be realized through the systems and methods disclosed herein. For example, simulated data can include realistic scenes, object sizes and motion, and sensor detection information because it is transformed from real automotive sensor data. These types of data transformations allow us to leverage ground truth labels of relevant traffic objects (e.g., pedestrians, bicyclists, vehicles, and so forth) from the original dataset, which is a time-consuming process to annotate. The methods disclosed herein are flexible, allowing for the simulation of different types of radar sensors by changing sensor specifications.

Also, there are currently very few or no public UAV datasets containing radar data of urban traffic scenes. The methods herein can use existing public data to train drones for perception and planning tasks on simulated but realistic data.

Methods herein also provide a bird's-eye view of a scene in real-time and may be used to develop challenging ADAS systems without sensors. For these reasons, approaches disclosed herein can be used to train drones for perception and planning tasks to be executed in inclement weather where camera data may be unavailable—such as package delivery and surveillance in foggy or rainy weather.

Illustrative Embodiments

Turning now to the drawings, FIG. 1 depicts an illustrative architecture 100 in which techniques and structures of the present disclosure may be implemented. The architecture 100 includes a vehicle 102, a UAV 104. The vehicle 102 can operate in an environment 110 that can include pedestrians, vehicles, and/or infrastructure. It will be understood that the objects in the environment 110 can change as the vehicle 102 is driven (or autonomously navigates). In one example, the environment can include objects 105, such as a bicycle and/or a tree, however, these are only example objects. Another example of environment is illustrated in FIG. 2.

Figure 2:
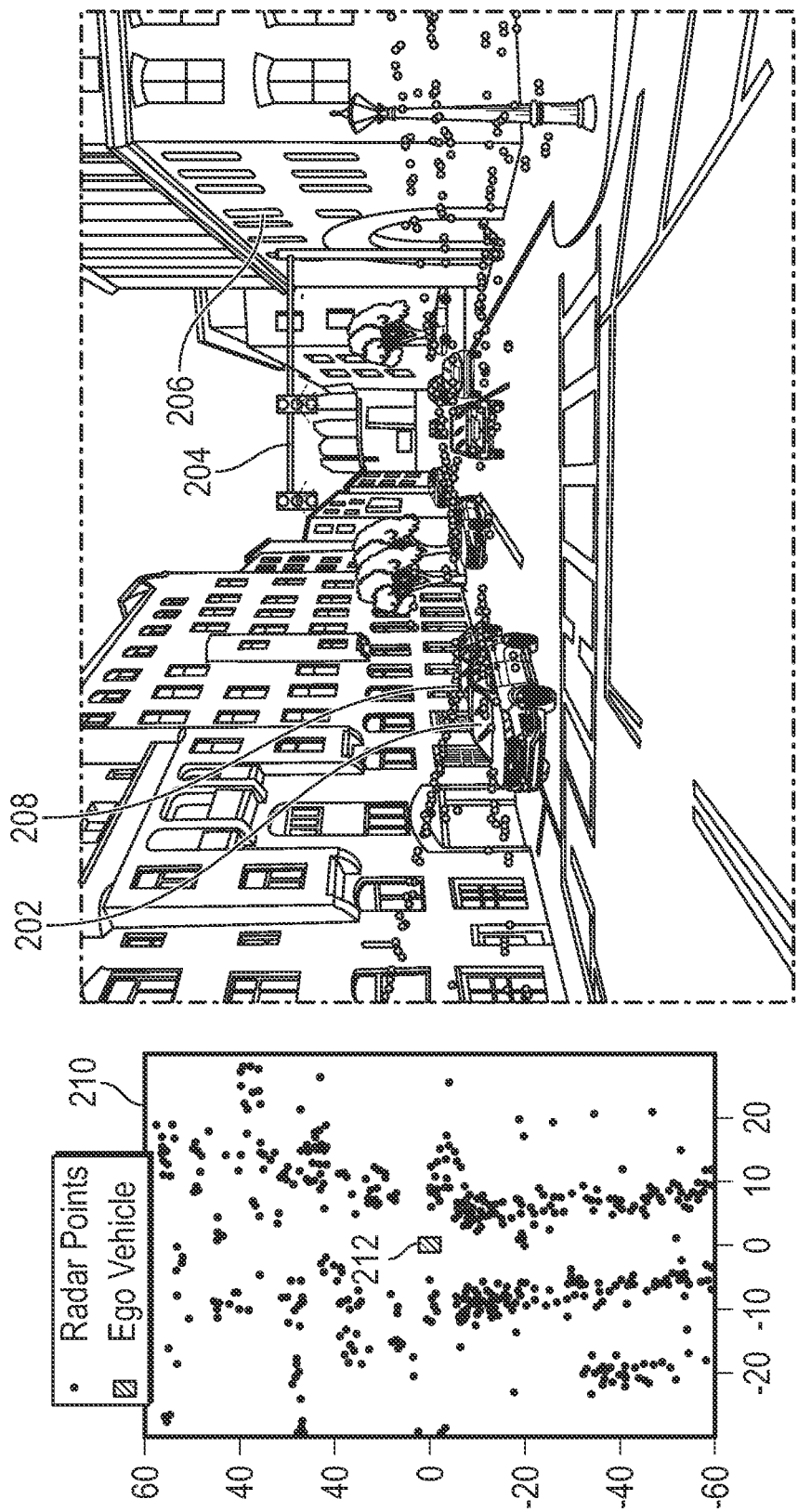
FIG. 2 illustrates an example environment with radar data included, along with a radar data plot in accordance with one or more embodiments of the present disclosure.

For example, in FIG. 2, the vehicle is operating in an urban environment having an additional vehicle 202, a streetlight 204, and buildings, such as building 206. Sensors 103 placed on the vehicle identify the presence of these objects and these data can be transformed for use by the UAV 104. The radar image is comprised of radar data, represented in FIG. 2 as dots in lines and clouds, such as dot line 208. These dots can be plotted from above as illustrated in plot 210. The plot shows the linear distancing of dots from a representation 212 of the vehicle.

Figure 3:
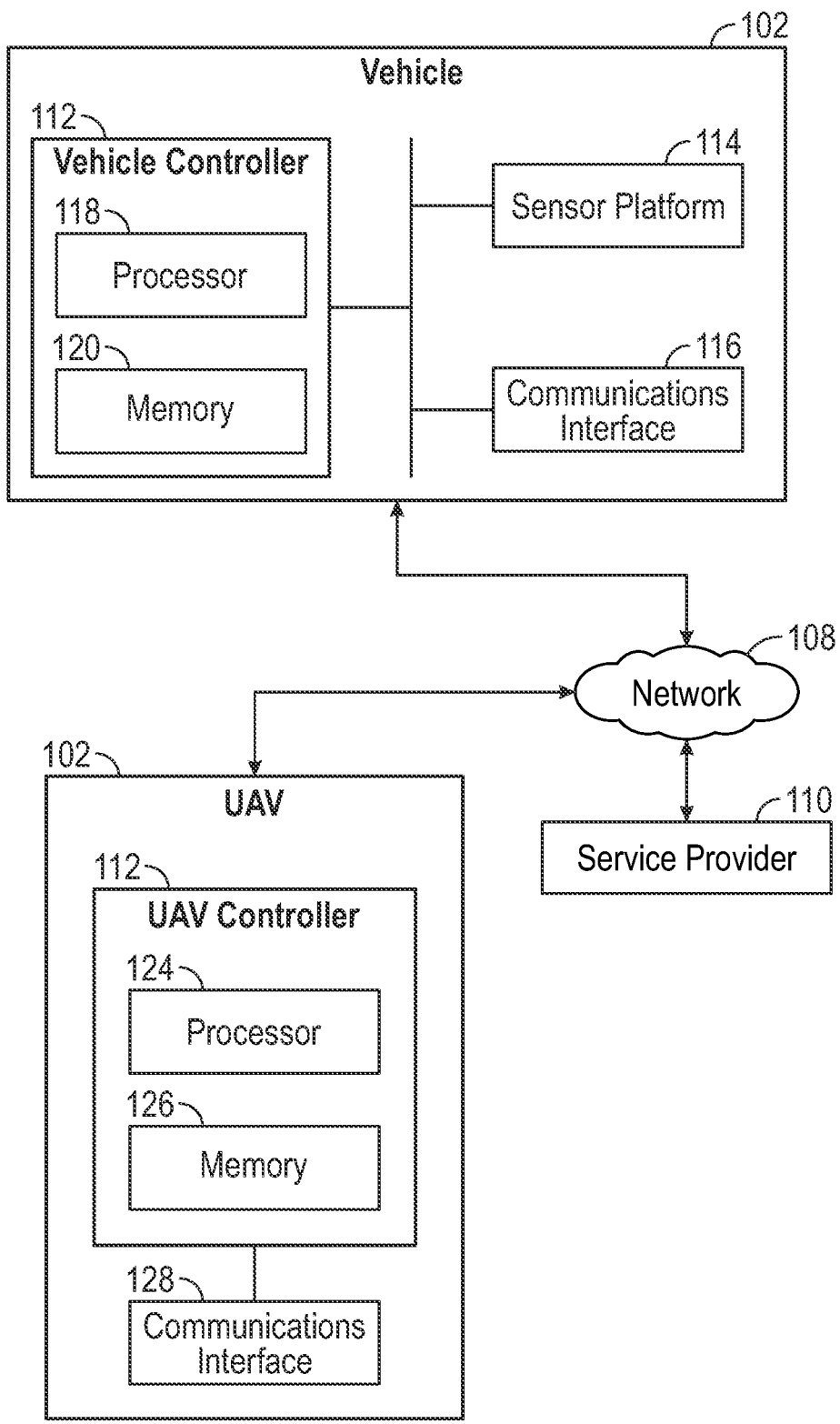
FIG. 3 is a schematic diagram of an example system that includes a vehicle, a UAV, and a service provider communicatively connected through a network in accordance with one or more embodiments of the present disclosure.

Referring now to FIGS. 1 and 3 collectively, the architecture can include not only the vehicle 102 and UAV 104, and a service provider 106, and a network 108. In general, components of the architecture can communicate over a network 108. The network 108 can include combinations of networks. For example, the network 108 may include any one or a combination of multiple different types of networks, such as cellular, cable, the Internet, wireless networks, and other private and/or public networks. The network 108 can include either or both short and long-range wireless networks.

The vehicle 102 can comprise a vehicle controller 112, a sensor platform 114, and a communications interface 116. The vehicle controller 112 can include a processor 118 and memory 120. The memory stores instructions that can be executed by the processor 118 to perform any of the methods disclosed herein. It will be understood that when reference is being made to actions performed by the vehicle controller 112, this includes execution of instructions by the processor 118. The vehicle controller 112 can communicate with the UAV 104 over the network 108. In some instances, the vehicle controller 112 can include the controller associated with the vehicle's ADAS. In some instances, the vehicle controller 112 is a stand-alone module that can cooperatively operate with the ADAS of the vehicle.

The sensor platform 114 can include any number of sensors 103 that include but are not limited to radar, light imaging and ranging (LiDar), ultrasonic, radiofrequency (RF), cameras, and other similar sensors that would be included on a connected vehicle platform having an ADAS or other similar driver assistance feature(s).

In general, as the vehicle 102 operates, the sensor platform 114 obtains sensor data from the various sensors included. The sensor data can be gathered in raw and/or processed formats. In one example, radar data is obtained from a radar of the sensor platform 114. It will be understood that automotive radar is typically Frequency Modulated Continuous Wave (FMCW) radar, which is a relatively inexpensive type of radar that can detect information including range, azimuth angle, and radial velocity. However, these radar devices typically do not provide any resolution in elevation and therefore are usually mounted parallel to the ground plane of the vehicle.

One example radar can include a lightweight, phased array having a two-dimensional Field of View (FOV) 111 of 120° azimuth by 80° elevation, with an angular resolution of 2° and 6° respectively. To be sure, this is just an example radar, and other types of radar with a two-dimensional FOV can be simulated in accordance with the present disclosure.

It will also be understood that there are many different types of radar, which are usually application-specific. For example, UAVs might use radar for ground penetration tasks, topographic mapping, or detecting other AVs, and in each case, the type of radar and its specifications may be different. Thus, before transforming the radar data obtained from a vehicle, the specific radar output parameters can be accounted for. These specific radar output parameters are referred to as radar calibration information.

Once the radar data is obtained, the vehicle radar data can be processed into UAV radar data at the vehicle level by the vehicle controller 112. In other examples, the radar data can be transmitted by the vehicle controller 112 of the vehicle to the service provider 106. The service provider 106 can include, for example, a cloud service or other remote computing service. The service provider 106 can be configured to process the vehicle radar data into UAV radar data. In yet other configurations, the vehicle 102 can transmit vehicle radar data directly to the UAV 104 and the UAV can be configured to process the vehicle radar data into UAV radar data. For purposes of brevity and clarity, the examples provided below will assume that the vehicle radar data is transmitted by the vehicle 102 directly to the UAV 104 over a wireless connection. The UAV can be configured to transform the vehicle radar data into UAV radar data.

Thus, the UAV 104 can comprise a UAV controller 122 can include a processor 124 and memory 126. The memory stores instructions that can be executed by the processor 124 to perform any of the methods disclosed herein. It will be understood that when reference is being made to actions performed by the UAV controller 122, this includes the execution of instructions by the processor 124. The UAV controller 122 can communicate with the vehicle 102 and/or the service provider 106 over the network 108. The UAV 104 can also comprise a communications interface 128. The UAV 104 can transmit simulated UAV radar or sensor output to the vehicle 102 or the service provider 106.

The UAV controller 122 can be configured to receive the vehicle radar data and transform the vehicle radar data into UAV radar data (UAV perspective). This can involve obtaining location information for the vehicle. The analysis includes evaluating a simulated UAV at the same cartesian coordinates (x, y) position as the vehicle 102. The simulated UAV is evaluated as flying at a height H above the vehicle 102. A simulated radar is mounted on the bottom of the simulated UAV. This simulated radar is considered to be oriented so as to be facing directly down, providing a Birds-Eye View (BEV) of the environment 110.

The height H that the UAV is flying is chosen to match the simulated radar's FOV 130 as closely as possible to the ego vehicle's field of view, to best utilize the angular resolution of the UAV radar. Then, for each radar detection in the vehicle radar data set, a geometric transformation is performed by the UAV controller 122 to convert the vehicle radar data set into the UAV's perspective. The UAV controller 122 can convert vehicle radar data into a vehicle coordinate frame using the radar calibration obtained for the specific radar. Next, the UAV controller 122 can convert radar points from the vehicle coordinate frame into a global frame using vehicle GPS coordinates, which can include using GPS and/or inertial measurement unit (IMU) to compensate for pitch, yaw, roll, and vehicle motion components. The UAV controller 122 can then convert radar points from a global frame into UAV coordinate frame using UAV GPS coordinate, where the UAV GPS is equivalent to the vehicle GPS coordinates (x, y, 0) in combination with the height H, where H=(x, y, h).

The UAV controller 122 can then convert radar points from the UAV coordinate frame into a simulated radar sensor frame using the simulated radar calibration. In some instances, the UAV controller 122 can add noise (e.g., Gaussian) to the simulated points to account for the limitations of angular resolution of the vehicle radar sensor, based on the sensor specifications (e.g., sensor calibration data). It will be understood that the UAV controller 122 can repeat this process for each frame in a scene, resulting in a simulated dataset of the UAV flying directly above a path of the vehicle, with simulated radar detections being generated for a BEV radar.

Improvements to increase radar simulation realism, leveraging other sensors in the dataset, if available. For example, if LiDAR data is available in the vehicle dataset, the LiDAR can be used to resolve elevation ambiguities that may be present in the vehicle radar data.

When only radial velocity is returned from the vehicle radar, transforming the vehicle radar data into a UAV perspective may not produce realistic results. However, when cameras are available in the automotive dataset, optical flow from cameras can be integrated to determine the three-dimensional velocity of objects, resulting in realistic radial velocity for UAV simulated points (e.g., simulated radar sensor frame points).

Figure 4:
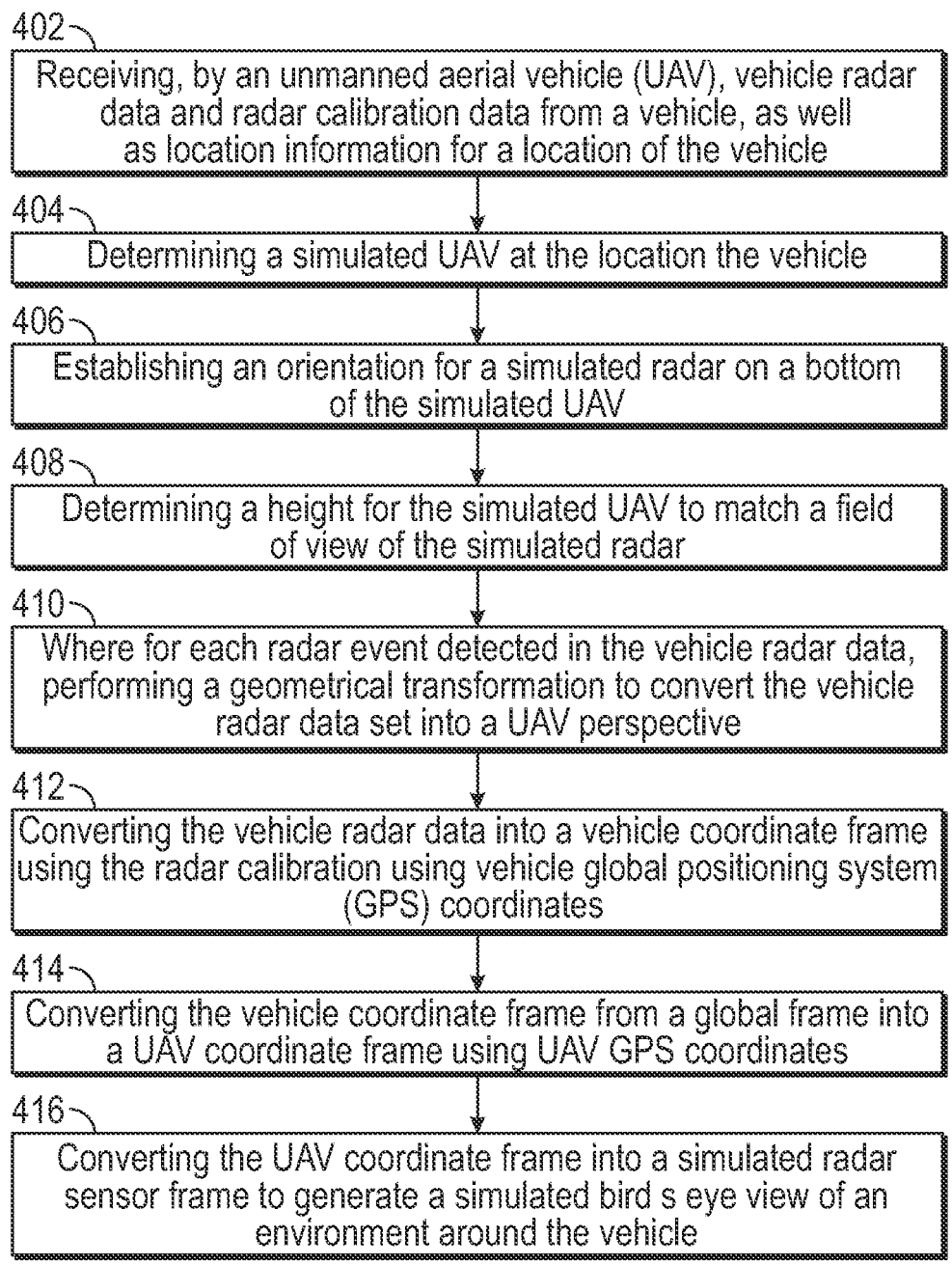
FIG. 4 is a flowchart of one example method in accordance with one or more embodiments of the present disclosure.

FIG. 4 is a flowchart of an example method. The method can include a step 402 of receiving, by an unmanned aerial vehicle (UAV), vehicle radar data and radar calibration data from a vehicle, as well as location information for a location of the vehicle. The vehicle radar data can include detection points obtained by a radar mounted on the vehicle.

In step 404, the method includes determining a simulated UAV at the location the vehicle, as well as a step 406 of establishing an orientation for a simulated radar on a bottom of the simulated UAV. As noted above, this can include a field of view that is pointed directly down. Next, the method can include a step 408 of determining a height for the simulated UAV to match a field of view of the simulated radar.

In some instances, the method can include a step 410 where for each radar event detected in the vehicle radar data, performing a geometrical transformation to convert the vehicle radar data set into a UAV perspective. Next, the method includes a step 412 of converting the vehicle radar data into a vehicle coordinate frame using the radar calibration using vehicle global positioning system (GPS) coordinates.

In one example, the method includes a step 414 of converting the vehicle coordinate frame from a global frame into a UAV coordinate frame using UAV GPS coordinates, as well as a step 416 of converting the UAV coordinate frame into a simulated radar sensor frame to generate a simulated bird's eye view of an environment around the vehicle.

Figure 5:
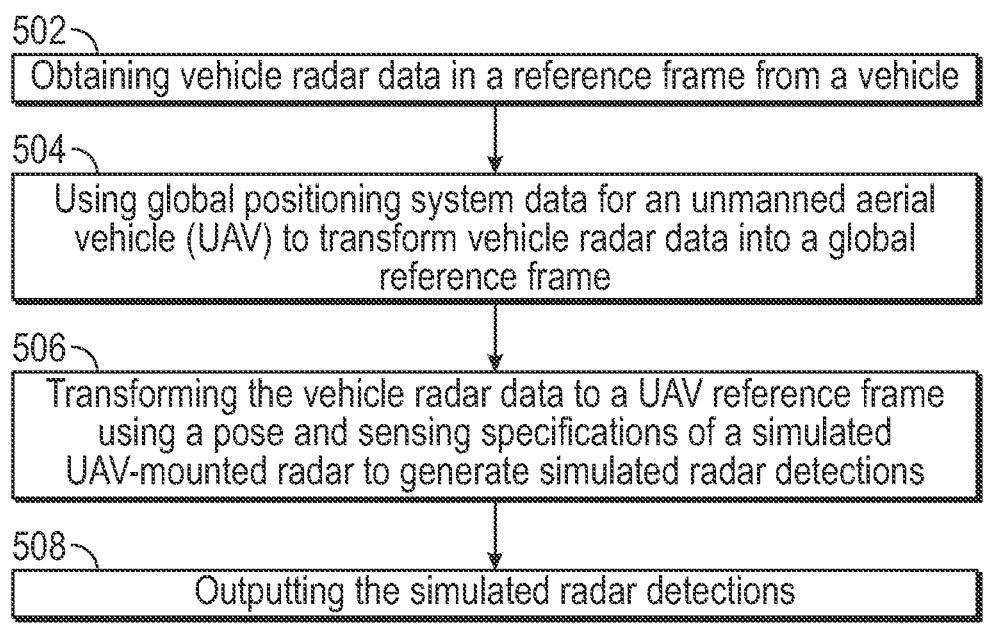
FIG. 5 is a flowchart of another example method in accordance with one or more embodiments of the present disclosure.

FIG. 5 is a flowchart of another example method that includes a step 502 of obtaining vehicle radar data in a reference frame from a vehicle. Next, the method includes a step 504 of using global positioning system data for an unmanned aerial vehicle (UAV) to transform vehicle radar data into a global reference frame. In some instances, the method includes a step 506 of transforming the vehicle radar data to a UAV reference frame using a pose and sensing specifications of a simulated UAV-mounted radar to generate simulated radar detections, as well as a step 508 of outputting the simulated radar detections.

As noted above, the method can include adding noise to the vehicle radar data to account for limitations of angular resolution of a vehicle radar sensor, based on radar calibration data. In addition to noise, other detections from sensors such as LiDAR or camera flow can be used as well.

Implementations of the systems, apparatuses, devices and methods disclosed herein may comprise or utilize a special purpose or general-purpose computer including computer hardware, such as, for example, one or more processors and system memory, as discussed herein. Computer-executable instructions comprise, for example, instructions and data that, when executed at a processor, cause a general-purpose computer, special purpose computer, or special purpose processing device to perform a certain function or group of functions. An implementation of the devices, systems and methods disclosed herein may communicate over a computer network. A "network" is defined as one or more data links that enable the transport of electronic data between computer systems and/or modules and/or other electronic devices.

Although the subject matter has been described in language specific to structural features and/or methodological acts, it is to be understood that the subject matter defined in the appended claims may not necessarily be limited to the described features or acts described above. Rather, the described features and acts are disclosed as example forms of implementing the claims.

While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described exemplary embodiments but should be defined only in accordance with the following claims and their equivalents. The foregoing description has been presented for the purposes of illustration and description. It is not intended to be exhaustive or to limit the present disclosure to the precise form disclosed. Many modifications and variations are possible in light of the above teaching. Further, it should be noted that any or all of the aforementioned alternate implementations may be used in any combination desired to form additional hybrid implementations of the present disclosure. For example, any of the functionality described with respect to a particular device or component may be performed by another device or component. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

While various embodiments have been described above, it should be understood that they have been presented by way of example only, and not limitation. The descriptions are not intended to limit the scope of the invention to the particular forms set forth herein. To the contrary, the present descriptions are intended to cover such alternatives, modifications, and equivalents as may be included within the spirit and scope of the invention as defined by the appended claims and otherwise appreciated by one of ordinary skill in the art. Thus, the breadth and scope of a preferred embodiment should not be limited by any of the above-described exemplary embodiments.

What is claimed is:

1. A method comprising:
receiving, by an unmanned aerial vehicle (UAV), vehicle radar data and radar calibration data from a vehicle, as well as location information for a location of the vehicle;
determining a simulated UAV at the location of the vehicle;
establishing an orientation for a simulated radar on a bottom of the simulated UAV;
determining a height for the simulated UAV to match a field of view of the simulated radar;
for each radar event detected in the vehicle radar data, performing a geometrical transformation to convert the vehicle radar data set into a UAV perspective;
converting the vehicle radar data into a vehicle coordinate frame using the radar calibration data and vehicle global positioning system (GPS) coordinates;
converting the vehicle coordinate frame from a global frame into a UAV coordinate frame using UAV GPS coordinates; and
converting the UAV coordinate frame into a simulated radar sensor frame to generate a simulated bird's eye view of an environment around the vehicle.

2. The method according to claim 1, wherein the orientation for the simulated radar is facing directly down above the vehicle.

3. The method according to claim 1, further comprising matching the field of view of the simulated radar to a field of view of the vehicle.

4. The method according to claim 1, further comprising converting the vehicle radar data using GPS and/or inertial measurement unit (IMU) data to compensate for pitch, yaw, roll, and other vehicle motion components.

5. The method according to claim 1, further comprising converting the UAV coordinate frame into the simulated radar sensor frame using a simulated radar calibration.

6. The method according to claim 1, further comprising adding noise to simulated points of the simulated radar sensor frame to account for limitations of angular resolution of a vehicle radar sensor, based on the radar calibration data.

7. The method according to claim 1, wherein the method is repeated for each frame in a scene, resulting in a simulated dataset of the UAV flying directly above the vehicle.

8. The method according to claim 1, further comprising integrating light imaging and ranging (LiDAR) data obtained from the vehicle to resolve elevation ambiguities in the vehicle radar data.

9. The method according to claim 1, further comprising integrating optical flow from vehicle cameras to determine three-dimensional velocity of objects, resulting in realistic radial velocities for simulated radar sensor frame points.

10. An unmanned aerial vehicle (UAV) comprising:
a UAV controller comprising
a processor; and
a memory, the processor executing instructions stored in the memory to:
receive vehicle radar data and radar calibration data from a vehicle, as well as location information for a location of the vehicle;
determine a simulated UAV at the location of the vehicle;
establish an orientation for a simulated radar on a bottom of the simulated UAV;
determine a height for the simulated UAV to match a field of view of the simulated radar;
for each radar event detected in the vehicle radar data, perform a geometrical transformation to convert the vehicle radar data set into a UAV perspective;
convert the vehicle radar data into a vehicle coordinate frame using the radar calibration data and vehicle global positioning system (GPS) coordinates;
convert the vehicle coordinate frame from a global frame into a UAV coordinate frame using UAV GPS coordinates; and
convert the UAV coordinate frame into a simulated radar sensor frame to generate a simulated bird's eye view of an environment around the vehicle.

11. The UAV according to claim 10, wherein the orientation for the simulated radar is facing directly down above the vehicle.

12. The UAV according to claim 10, wherein the processor is configured to match the field of view of the simulated radar to a field of view of the vehicle.

13. The UAV according to claim 10, wherein the processor is configured to convert the vehicle radar data using GPS and/or inertial measurement unit (IMU) data to compensate for pitch, yaw, roll, and other vehicle motion components.

14. The UAV according to claim 10, wherein the processor is configured to convert the UAV coordinate frame into the simulated radar sensor frame using a simulated radar calibration.

15. The UAV according to claim 10, wherein the processor is configured to add noise to simulated points of the simulated radar sensor frame to account for limitations of angular resolution of a vehicle radar sensor, based on the radar calibration data.

16. The UAV according to claim 10, wherein the processor is configured to repeat generating of the simulated bird's eye view for each frame in a scene, resulting in a simulated dataset of the UAV flying directly above the vehicle.

17. The UAV according to claim 10, wherein the processor is configured to integrate light imaging and ranging (LiDAR) data obtained from the vehicle to resolve elevation ambiguities in the vehicle radar data.

18. The UAV according to claim 10, wherein the processor is configured to integrate optical flow from vehicle cameras to determine three-dimensional velocity of objects, resulting in realistic radial velocities for simulated radar sensor frame points.

19. A method comprising:
obtaining vehicle radar data in a reference frame from a vehicle;
using global positioning system data for an unmanned aerial vehicle (UAV) to transform vehicle radar data into a global reference frame;
transforming the vehicle radar data to a UAV reference frame using a pose and sensing specifications of a simulated UAV-mounted radar to generate simulated radar detections; and
outputting the simulated radar detections.

20. The method according to claim 19, further comprising adding noise to the vehicle radar data to account for limitations of angular resolution of a vehicle radar sensor, based on radar calibration data.

* * * * *